United States Patent Office 2,925,822
Patented Feb. 23, 1960

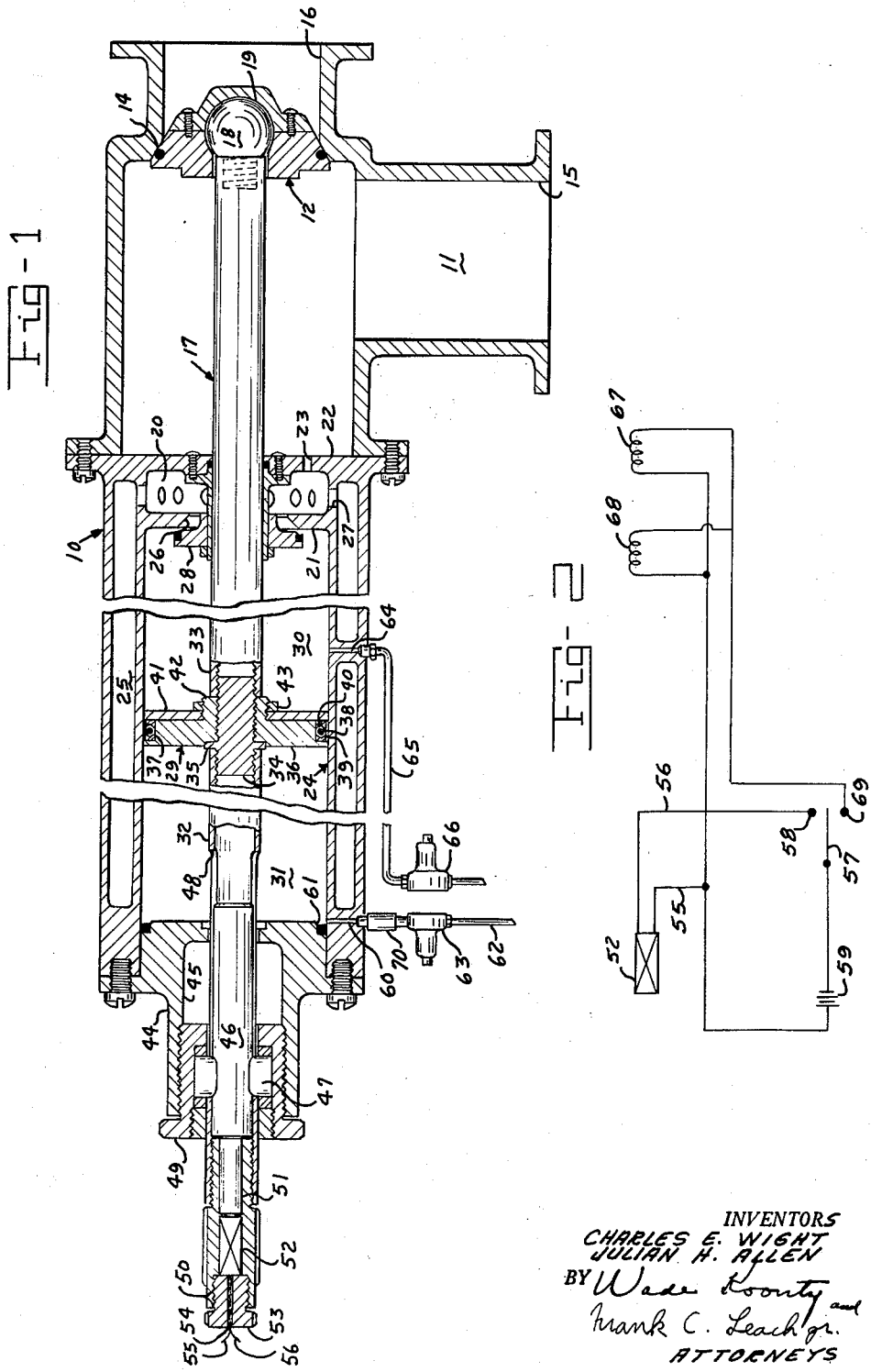
INVENTORS
CHARLES E. WIGHT
JULIAN H. ALLEN
BY Wade Koonty and
Frank C. Leach Jr.
ATTORNEYS

2,925,822

VALVE DEVICE

Charles E. Wight and Julian H. Allen, Dayton, Ohio, assignors to the United States of America as represented by the Secretary of the Air Force Application November 2, 1955, Serial No. 544,620

8 Claims. (Cl. 137—68)

(Granted under Title 35, U.S. Code (1952), sec. 266)

The invention described herein may be manufactured and used by or for the United States Government for governmental purposes without payment to us of any royalty thereon.

This invention relates to a valve device and, more particularly, to a valve that is opened at high speeds under any pressure condition.

It is often desired to rapidly release gases under high pressures. The valve devices currently employed in releasing gases under high pressures have the disadvantages of not being capable of repeating the operation and of being limited as to the pressure ranges at which they will satisfactorily operate. One of the type of valve devices currently employed for rapidly releasing high pressure gas is a frangible diaphragm type valve in which the diaphragm must be replaced each time the valve is actuated. This frangible diaphragm valve also has the disadvantage of not being capable of precise timing for releasing the gas. The present invention satisfactorily solves these problems by rapidly releasing the gas under pressure with precise timing of the release and no substantial limitation as to the pressure range.

This invention relates to a valve assembly comprising a body and a passageway therethrough with a valve seat therein. A valve cooperates with the seat to open and close the passageway. The valve has a shaft connected thereto and a force is exerted on the shaft to move the valve to its open position.

The attached drawing illustrates a preferred embodiment of the invention, in which Fig. 1 is a longitudinal sectional view of the present invention; and Fig. 2 is a schematic view of the electrical circuit employed in the present invention.

Referring to the drawing and particularly Fig. 1, there is shown a valve body 10 having a passageway 11 extending through a portion thereof. The flow of gas through the passageway 11 is controlled by a valve 12 that cooperates with a valve seat 14 in the passageway 11. The passageway 11 has an inlet 15 in communication with a source of high pressure gas. Thus, when the valve 12 closes the passageway 11, the portion of the passageway 11 communicating with the inlet 15 is subject to the high pressure.

The passageway 11 has an outlet 16 through which the high pressure gas passes rapidly when the valve 12 is moved to its open position. A hollow shaft 17 is connected to the valve 12 for moving the valve between its open and closed positions. As clearly shown in Fig. 1, the shaft 17 extends through the valve body 10. The connection between the shaft 17 and the valve 12 is a ball and socket type of joint in which a spherical member 18 is threaded into one end of the shaft 17 and is disposed within a spherical recess 19 in the valve 12. This type of connection permits swiveling of the valve 12 to insure that the valve 12 will seat on the valve seat 14.

The valve body 10 has a chamber 20 formed between walls 21 and 22. An orifice 23 in the wall 22 provides communication between the passageway 11 and the chamber 20 whereby the chamber 20 and the passageway 11 are at the same pressure when the valve 12 closes the passageway 11. The valve body includes an inner chamber 24 surrounded by an outer chamber 25. On opening 26 in the wall 21 permits communication between the chamber 20 and the inner chamber 24. A plurality of openings 27 in the peripheral wall of the chamber 20 allow free flow between the chamber 20 and the outer chamber 25. Thus, it will be observed that the inner chamber 24 and the outer chamber 25 communicate through the chamber 20. A check valve 28 cooperates with the opening 26 to stop gas flow between the chambers 20 and 24 when desired.

As readily observed in Fig. 1, the shaft 17 extends through the chambers 20 and 24. A piston 29 is connected to a portion of the shaft disposed in the chamber 24. This piston divides the chamber 24 into two portions or compartments 30 and 31. The shaft 17 comprises portions 32 and 33 joined together by a threaded coupling 34. The coupling 34 has a shoulder portion 35 that abuts against the end of the portion 32 of the shaft 17. The piston 29 comprises a member 36 threaded on the coupling 34 and abutting against its shoulder portion 35. The member 36 has a recess 37 in its periphery in which is disposed an O ring seal 38 with backup rings 39 and 40, which preferably are made of a suitable plastic material, on each side thereof. This seal assembly is held in the recess 37 by a plate 41 secured to a threaded portion 42 of the member 36. The portion 42 has a smaller diameter than the remainder of the member 36. The plate 41 is held against the member 36 by a nut 43, which is threaded on the portion 42 of the member 36. Thus, the O ring seal 38 and its components provide a seal between the compartments 30 and 31 of the chamber 24.

The valve body 10 includes an end member 44, which forms one wall of the compartment 31 of the chamber 24. The end member 44 has a recess 45 through which the portion 32 of the shaft 17 extends. A stop member 46 is disposed within the interior of the portion 32 of the hollow shaft 17 to limit its movement. The stop member 46 includes protruding arms 47 that extend through a cutaway portion 48 of the shaft 17 into the recess 45. The position of the stop member 46 with respect to the shaft 17 is determined by an adjustment screw 49, which is threaded into the walls of the recess 45 of the end member 44. Thus, the adjustment screw 49 is threaded into the recess an extent sufficient to insure that the valve 12 seats against its valve seat 14.

A hollow member 50, which is substantially cylindrical, is threaded into the end of the portion 32 of the shaft 17 and surrounds a reduced portion 51 of the stop member 46. An explosive substance 52 is disposed in the interior of the hollow member 50 adjacent the reduced portion 51. A cap head 53 is threaded into the end of the member 50 to hold the explosive substance 52 within the member 50. A pair of electrical wires 55 and 56 extend through a passage 54 in the cap head 53 to ignite the explosive substance 52 when desired.

The operation of the present invention will be considered with the passageway 11 closed by the valve 12, as shown in Fig. 1, so that the passageway 11 contains a high pressure gas. With the valve 12 in its closed position, the gas passes through the orifice 23 into the chamber 20 from which it passes into the outer chamber 25 through the openings 27 and into the compartment 30 of the inner chamber 24 through the opening 26. Thus, the chamber 20, the outer chamber 25, and the compartment 30 of the inner chamber 24 are at the same pressure as existing in the passageway 11.

When it is desired to move the valve 12 from its closed position, the explosive substance 52 is ignited. This ignition of the explosive substance 52 is accompanied by moving the switch 57 into engagement with contact 58 to place the wires 55 and 56, which are connected with the explosive substance 52, in the circuit with an electrical source 59. When the explosive substance is ignited, it expands by moving the hollow member 50 and the shaft 17 to the left, as viewed in Fig. 1. The arms 47 of the stop member 46 prevent any movement of the stop member to the right so that all the force of the explosive substance is utilized to urge the shaft 17 to the left; this results in the valve 12 moving rapidly from its valve seat 14 to open the passageway 11 to release the gas through the outlet 16.

It will be observed that the portion 32 of the shaft 17 is not sealed with respect to the end member 44 so that the compartment 31 of the chamber 24 is exposed at atmospheric pressure. Thus, the sudden movement of the shaft 17 and the piston 29 produces a sudden compression of the air in the compartment 31 during the initial thrust. This compression in the compartment 31 cushions the movement of the piston 29. During the initial movement of the shaft 17 and the piston 29 to the left as viewed in Fig. 1, part of the gas escapes from the chambers 20 and 25 into the compartment 30 of the chamber 24 through the opening 26.

The volume of the compartment 30 expands as the piston 29 moves to the left during the initial movement of the shaft 17 to produce a pressure drop in this compartment even though additional gas passes through the opening 26 from the chambers 20 and 25. As the volume of the compartment 30 increases, the pressure continues decreasing until the force resulting from the pressure in the compartment 31 acting on the piston 29 is greater than the force resulting from the pressure in the compartment 30 so that the direction of the movement of the shaft is changed and the piston moves to the right as viewed in Fig. 1.

Since the high pressure gas in the passageway 11 is rapidly passing through the outlet 16, it does not flow through the orifice 23 into the chamber 20 at this time. Since some of the gas from the chambers 20 and 25 has escaped into the compartment 30 through the opening 26 as the piston initially moved to the left, the pressure in the chambers 20 and 25 is less than the pressure in the compartment 30 when the piston 29 moves to the right. This pressure differential causes the check valve 28 to close the opening 26 to stop escape of gas from the compartment 30 into the chamber 20. This insures that the valve 12 cannot return to its closed position since the check valve 28 maintains a sufficient pressure in the compartment 30 to limit the movement of the piston 29.

Since the check valve 28 has closed the opening 26, the pressure in the compartment 30 increases as the piston moves to the right until it exerts a force on the piston 29 greater than the force of the air pressure in compartment 31; the piston 29 then again moves to the left. As the piston again moves to the left, the volume of the compartment 30 expands and the pressure, of course, decreases in the compartment 30. This reduction of pressure in the compartment 30 results in gas from the chambers 20 and 25 flowing through the opening 26 since the pressure of this gas overcomes the pressure in the compartment 30 acting on check valve 28. This opening and closing of the check valve 28 occurs during the first two or three reciprocations of the shaft 17 and ceases thereafter since the pressure in the chambers 20 and 25 at such time is less than the pressure in the expanded compartment 30. During test runs of this equipment, it was found that a total of seven or eight reciprocations occurred before the piston 29 came to rest against the end member 44. With the piston 29 abutting the end member 44, the valve 12 remains in its open position as long as desired.

When it is desired to return the valve 12 to its closed position, air pressure is introduced through a passage 60 in the valve body 10 to act against the piston. The end member 44 has beveled corners 61 along the edge that abuts against the piston 29. Thus, even though the piston 29 is abutting against the end member 44, there is a slight annular chamber formed between the beveled corners 61 and the piston 29 into which the compressed air passes from the passage 60. An air line 62 connects the passage 60 to a source of air under pressure. The flow of air through the line 62 from its source to the passage 60 is controlled by a solenoid valve 63. At the same time that air is supplied through the passage 60 to move the piston 29 to the right, it is necessary to reduce the pressure in the compartment 30; otherwise, as the piston 29 moves to the right, the pressure in the compartment 30 would continue to increase so that it would be practically impossible to return the piston 29 to the position in which the valve 12 closes the passageway 11. A passage 64 in the valve body 10 connects the compartment 30 with a vent line 65 that permits escape of gas from the compartment 30. The vent line 65 has a solenoid valve 66 therein that prevents reduction of pressure in the compartment 30 except as required.

To insure that the air under pressure is supplied through the line 62 at the same time that the pressure is removed through the vent line 65, coils 67 and 68 of the solenoid valves 63 and 66, respectively, are connected in parallel. These coils are connected to the electrical source 59 by moving the switch 57 into contact with a contact 69. Thus, when the coils 67 and 68 are energized, the solenoid valves 63 and 66 are opened and air pressure is supplied to the compartment 31 and the gas is vented from the compartment 30 to move the piston to the right whereby the valve 12 engages its valve seat 14 to close the passageway 11. A check valve 70 is disposed in the line 62 between the solenoid valve 63 and the passage 60 to prevent any leakage of pressure from the compartment 31 during the valve opening operation.

With the valve 12 again in its closed position, the passageway 11 is closed and the pressure again increases in the passageway 11, the chambers 20 and 25 and the compartment 30 of the chamber 24, as previously explained. It is then only necessary to remove the cap head 53 from the hollow member 50 and insert a new explosive substance 52. The operation is then repeated when desired.

It will be understood that the use of the explosive substance permits the opening of the valve at a high speed. If a slower opening time of the valve is required, other suitable means may be employed for actuating the shaft 17 to move the valve 12 to its open position. Among the types of motive means that could be employed are a solenoid operated mechanism, a motor operated mechanism, a mechanical linkage system, an air pressure system, or manual means. It will be noted that the pressure acting on the valve 12 and the pressure acting on the piston 29 when the valve 12 is in its closed position are the same, as previously explained. Thus, by making the areas of the valve 12 and piston 29 the same, equal and opposite forces are acting on these two members so that only a small force is necessary to move the valve 12 to its open position. Therefore, a large force is not required to open the valve 12 and most of the actuating force is thus employed to produce the desired opening speed. Therefore, the explosive substance produces the largest force and, accordingly, the highest opening speed. Likewise, the manual means produces the least force and thereby the slowest opening time.

While the switch 57 has been described as actuated manually, it will be understood that the switch 57 could be operated in response to any desired conditions. For example, the valve structure of the present invention could be employed in an automatic sprinkling system whereby the switch 57 would engage the contact 58 when a predetermined temperature existed. Similarly, the switch 57 would be moved to engage the contact 69 when a lower predetermined temperature resulted. Obviously, the mechanism would be so designed that the switch 57 would not engage the contact 69 if it had not been first actuated to engage the contact 58.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

We claim:

1. A valve assembly comprising a body having a transversely disposed passageway and an inlet in communication with the passageway adapted to deliver high pressure gas thereto, a first, relatively small chamber in communication with the passageway, a second relatively large inner chamber in communication with said first relatively small chamber and a third outer chamber surrounding said inner chamber in communication with said first relatively small chamber, said passageway having a valve seat therein, a valve cooperating with said valve seat to open and close said passageway, means normally maintaining said valve in its closed position comprising an elongated shaft attached to said valve, a check valve surrounding said shaft and adapted to block communication between said first and second chambers when the pressure in said second chamber is greater than that in said first chamber and a piston mounted on said shaft and dividing said second chamber into two compartments, one of which being exposed to atmospheric pressure to act as a cushioning means on sudden movement of the shaft in the valve opening direction, an explosive actuated means to move said valve to its open position, and pressure actuated means to return said valve to its closed position.

2. A valve assembly comprising a body having a passageway therethrough adjacent one end portion thereof, said passageway having a valve seat therein, a valve cooperating with said valve seat to open and close said passageway, said body having a chamber therein, a shaft connected to said valve and extending through said chamber, a piston secured to the portion of said shaft in said chamber for movement in said chamber, said piston dividing said chamber into two portions, one of said portions of said chamber being subject to the same gas pressure acting on the valve when the valve is in its closed position and the other of said portions exposed to atmospheric pressure to provide a cushioning effect on said piston on movement thereof in the valve-opening direction, explosive means to move said shaft to open said valve, the piston secured to said shaft moving therewith to effect volume expansion of said one portion of said chamber to produce a gradually increasing pressure drop therein and a decrease in volume and gradual increase in pressure in said other portion of said chamber until the force acting on one side of said piston is greater than that acting on the other side to thus change the direction of movement thereof in the valve-closing direction, and means to supply gas under pressure to the other of said portions of said chamber whereby said shaft moves said valve to its closed position.

3. A valve assembly comprising a body having a passageway therethrough, said passageway having a valve seat therein, a valve cooperating with said valve seat to open and close said passageway, said body having a chamber therein, a shaft connected to said valve and extending through said chamber, a piston secured to the portion of said shaft in said chamber for movement in said chamber, said piston dividing said chamber into two portions, one of said portions of said chamber being subject to the same gas pressure acting on the valve when the valve is in its closed position and the other of said portions being subjected to atmospheric pressure to provide a cushioning layer of air rapidly compressed on sudden movement of the piston to the valve-opening position, explosive actuated means to move said shaft to open said valve, and means to supply gas under pressure to the other of said portions of said chamber to exert a force on said piston in said other portion of said chamber whereby said shaft moves said valve to its closed position.

4. A valve assembly comprising a body having a passageway therethrough, said passageway having a valve seat therein, a valve cooperating with said valve seat to open and close said passageway, said body having a first inner chamber therein, a second outer chamber circumferentially disposed relative thereto and a third chamber in communication between said first and second chambers and said passageway, a shaft connected to said valve and extending through said first and third chambers, a piston on the portion of said shaft in said first chamber to divide said chamber into two compartments, one of said compartments being in communication with the inlet side of said passageway through said third chamber whereby said one compartment, said third chamber and the inlet side of said passageway are subject to the same gas pressure, means actuating said shaft to move said valve to its open position, said actuating means disposed exterior of the chamber comprising an end member forming one wall of one of said compartments having a recess through which one end of said shaft extends, a stop member incorporated within said one end of said shaft having a plurality of protruding arms projecting into the recess, and a hollow member attached to the end of said shaft surrounding a portion of said stop member and incorporating an explosive and means to move said valve to its closed position.

5. A valve assembly comprising a body having a passageway therethrough, said passageway having a valve seat therein, a valve cooperating with said valve seat to open and close said passageway, said body having a chamber therein, a shaft connected to said valve and extending through said chamber, a piston on the portion of said shaft in said chamber to divide said chamber into two compartments, one of said compartments being in communication with the inlet side of said passageway whereby said one compartment and the inlet side of said passageway are subject to the same gas pressure, means actuating said shaft to move said valve to its open position, means to prevent flow of gas from said one compartment to said passageway when said valve is in its open position, and means to move said valve to its closed position.

6. A valve assembly comprising a body having a passageway therethrough, said passageway having a valve seat therein, a valve cooperating with said valve seat to open and close said passageway, said body having a chamber therein, a shaft connected to said valve and extending through said chamber, a piston on the portion of said shaft in said chamber to divide said chamber into two compartments, one of said compartments being in communication with said passageway whereby said one compartment and said passageway are subject to the same gas pressure, explosive means actuating said shaft to move said valve to its open position, and means to supply gas pressure to the other of said compartments to move said valve to its closed position comprising an air line adaptable for connection to a source of compressed air and a second passageway incorporated within one wall of said body in communication between said air line and the other of said compartments and a beveled end member secured to said body and surrounding said shaft to form a closure for the other of said compartments.

7. A valve assembly comprising a body having a passageway therethrough, said passageway having a valve seat therein, a valve cooperating with said valve seat to open and close said passageway, said body having a chamber therein, a shaft connected to said valve and extending through said chamber, a piston on the portion of said shaft in said chamber to divide said chamber into two compartments, one of said compartments being in communication with said passageway whereby said one compartment and said passageway are subject to the same gas pressure and the other of said compartments in communication with atmospheric pressure to effect a substantial cushioning of said piston on movement thereof towards the valve-opening direction, explosive actuated means actuating said shaft to move said valve to its open position, and means to supply gas pressure to the other of said compartments and to remove said gas pressure from said one compartment to move said valve to its closed position.

8. A valve assembly comprising a body having a passageway therethrough, said passageway having a valve seat therein, a valve cooperating with said valve seat to open and close said passageway, said body having a plurality of chambers therein, said body having an orifice providing communication between said passageway and one of said chambers, a shaft connected to said valve and extending through a second of said chambers, a piston on the portion of said shaft in said second chamber to divide said second chamber into two compartments, one of said compartments and said one chamber being in communication whereby the gas pressure in said passageway exists in said one chamber and said one compartment when said valve is in its closed position, means to actuate said shaft to move said valve to its open position, and means to prevent flow of gas from said one chamber to said one compartment when said valve is in its open position to maintain said valve in its open position.

References Cited in the file of this patent

UNITED STATES PATENTS

| 338,771 | Page | Mar. 30, 1886 |
| 441,045 | White | Nov. 18, 1890 |
| 540,003 | Reed | May 28, 1895 |
| 1,882,700 | Allen | Oct. 18, 1932 |
| 2,373,654 | Beekley et al. | Apr. 17, 1945 |
| 2,405,439 | Lubbock | Aug. 6, 1946 |
| 2,626,633 | Wilson | Jan. 27, 1953 |
| 2,751,183 | Crookston | June 19, 1956 |

FOREIGN PATENTS

| 471,540 | Great Britain | Sept. 6, 1937 |
| 1,105,983 | France | July 13, 1955 |